United States Patent

Caldwell et al.

[11] 4,286,423
[45] Sep. 1, 1981

[54] CROP CUTTING APPARATUS

[75] Inventors: Godfrey P. Caldwell, Oxford; Nigel W. Meek, Aylesbury, both of England

[73] Assignee: Agrimech Engineering Ltd., Aylesbury, England

[21] Appl. No.: 72,247

[22] Filed: Sep. 4, 1979

[30] Foreign Application Priority Data

Sep. 4, 1978 [GB] United Kingdom ............ 35446/78
Sep. 29, 1978 [GB] United Kingdom ............ 38763/78

[51] Int. Cl.³ .................................... A01D 35/264
[52] U.S. Cl. ........................................ 56/6; 56/13.6; 56/15.9
[58] Field of Search ............ 56/15.9, 16.2, 192, 56/6, 14.9, 13.6

[56] References Cited

U.S. PATENT DOCUMENTS

| | | | |
|---|---|---|---|
| 2,586,254 | 2/1952 | Pitre | 172/522 |
| 3,135,079 | 6/1964 | Dunn | 56/6 |
| 3,391,522 | 7/1968 | Zweegers | 56/6 |
| 3,527,032 | 9/1970 | Wood | 56/6 |
| 3,564,822 | 2/1971 | Engler | 56/6 |
| 3,857,225 | 12/1974 | Knudson | 56/15.9 |
| 3,950,923 | 4/1976 | Martenson et al. | 56/6 |
| 4,178,744 | 12/1979 | Allely et al. | 56/6 |
| 4,187,664 | 2/1980 | Meek et al. | 56/192 |

FOREIGN PATENT DOCUMENTS

| | | | |
|---|---|---|---|
| 1782238 | 7/1971 | Fed. Rep. of Germany | 56/192 |
| 2749097 | 5/1979 | Fed. Rep. of Germany | 56/15.9 |
| 1147236 | 4/1969 | United Kingdom | 56/192 |

*Primary Examiner*—Paul J. Hirsch
*Attorney, Agent, or Firm*—Schwartz & Weinrieb

[57] ABSTRACT

Crop cutting apparatus providing a wide cutting path and even cutting while following variations in ground level. Known drum and disc mowers of wide cut do not follow variations in ground level, and are easily damaged by ground shocks. Cutter drums 29, 29' and gear boxes 41, 41' are mounted on subframes 16, 16', which are pivotally mounted on main frame 13 to allow independent vertical movement of the drums 29, 29'. Each drum 29, 29' is driven by a flexible belt drive 42, 42' from its gear box 41, 41' to protect the gear boxes from ground shock. The gear boxes 41, 41' are driven by a cross-shaft 48 from a tractor p-t-o. The drums are driven by untimed drive and clash of cutting knives 31, 31' is prevented by a spacing roller 102 which rolls over a cam plate 102' and forces the drums 29, 29' apart when the drums are cutting at the same level. Support members 9 and 9' move apart on cross members 21, 21' and are linked together by tie bar 103 to give overlap of cutters when cutting at different levels.

20 Claims, 7 Drawing Figures

CROP CUTTING APPARATUS

FIELD OF THE INVENTION

The present invention relates to crop cutting apparatus and is concerned in particular, but not exclusively, with mowing apparatus suitable for cutting grass and other fodder crops.

BACKGROUND OF THE INVENTION

There are at present in use two main types of rotary mowers, namely the so-called disc mower and the so-called drum mower. Disc mowers comprise a plurality of relatively flat dish-shaped discs mounted along a transverse drive-casing and each carrying two or more outwardly projecting cutting blades, the discs being rotated in counter-rotating pairs. Drum mowers normally comprise one or more pairs of contra-rotating vertical drum-like members which carry at their lower ends outwardly extending skirts or flanges which in turn carry cutting blades mounted similarly to those on disc mowers. The purpose of drums is to assist inward and rearward movement of the cut crop so as to form regulated swaths behind the mower. Disc mowers may be driven from above or below, but commonly drum mowers depend from an upper frame and are driven from above. The present invention has particular application in connection with drum mowers, but may also have application in connection with disc mowers or other rotary crop cutting apparatus.

The recent trend in development of rotary mowers has been to increase the overall width of cut of the mower, and this has normally been achieved by mounting more small cutting units together on a fixed transverse mounting beam. This has resulted in a wide cutting implement which effects the cutting operation in a single plane and this gives uneven cutting on undulating ground. A further difficulty arises where a wide mower is produced with a multitude of drum cutters, in that a number of separate swaths are produced behind the machine which leads to problems in handling and treating the cut crop.

Another disadvantage which arises with known drum mowers comes from the conventional drive used in which a transverse shaft running across the tops of the drums drives the drums through bevel gears in gear boxes mounted directly on top of the drums. Most drum mowers are driven by direct gearing with a large gear box structure along the top of the drums and direct drive to the drums through the bevel gears. The gear case forms part of the structure of the machine and is subject to distortion and damage while in use. In such arrangements, the set of bevel gears has no protection or shock absorption provided so that it is subjected to high shock loads transmitted from the ground or obstacles met by the cutters while cutting. With the bevel-gear drive system presently used for drum mowers the centre spindle of the drum is driven, which makes it difficult to make a simple and robust design of drum and spindle as it is essential that the centre spindle of the drum is driven.

If an attempt is made to increase the width of cut of a conventional rotary mower by increasing the diameters of the discs or of the skirts of the drums (so as to avoid providing a relatively large number of rotary units) the problems outlined above are magnified by the weight of the resulting machine and the size of drive gear boxes required. It also follows that damage to such gear boxes is more costly if the size of the units is increased. Furthermore, if conventional designs of drum mower are scaled-up the resulting shocks on the drums from use on uneven ground are increased as the width of the rigid transverse mounting for the drum is increased.

A further disadvantage which arises with the drum mowers of conventional nature with relatively small drums is the difficulty of passing the cut crop between the restricted opening between the drums. If the drums are made smaller in relation to the circumference of the cutting blades, the drums become subject to wrapping of the crop around them. These disadvantages of conventional drum mowers again indicate the benefits which would arise from use of larger drum mowers, but mere increase of size of conventional units gives rise to the disadvantages outlined above.

OBJECTS OF THE INVENTION

It is one object of the present invention, when put into effect in accordance with preferred features thereof, to allow the construction of rotary mowers of larger diameter than have previously been possible, whilst mitigating or avoiding some or all of the problems outlined above.

SUMMARY OF THE INVENTION

According to the present invention there is provided crop cutting apparatus comprising a main frame, at least one pair of rotary cutting devices each for cutting crop by rotation about a vertical axis, the vertical axes of the cutting devices being spaced apart transversely relative to the intended direction of forward travel of the apparatus, each cutting device being mounted to allow substantially vertical movement of the device relative to the main frame independent of vertical movement of the other cutting device or devices, and each cutting device having a drive linkage individual thereto comprising a drive device spaced from the axis of the cutting device and at least one endless elongate drive member coupling the drive device to the cutting device for driving the cutting device in rotation.

Preferably each cutting device has a subframe individual thereto on which the cutting device and its associated drive device are mounted, each subframe being movably mounted on the main frame to allow substantially vertical movement of the subframe relative to the main frame independent of vertical movement of the other subframe or subframes. Conveniently each subframe is pivotally linked to the main frame, and preferably each subframe is linked to the main frame by a pivotal linkage of parallel members which allows vertical movement of the subframe while maintaining the disposition of the subframe to the ground substantially constant. It is further preferred that the said pivotal linkage is aligned along the intended direction of travel of the apparatus with the axes of pivotting substantially horizontal and perpendicular to the said intended direction of travel. Conveniently there are provided spring means acting between each subframe and the main frame providing an upward force on the subframe at least partially supporting the cutting means.

In accordance with a preferred feature of the invention, each cutting device and its associated drive device are spaced apart in the intended direction of forward travel of the cutting apparatus and each endless elongate drive member is entrained along a drive path having a longitudinal axis aligned generally longitudinally of the apparatus relative to the intended direction of forward travel of the apparatus. By the longitudinal axis of the drive path being aligned generally longitudinally of the apparatus is meant that the longitudinal axis is aligned in a direction which, when resolved into a horizontal plane, is inclined to the intended direction of forward travel of the apparatus by no more than 45°. Most preferably each cutting device and its associated drive device are positioned one behind the other in line with the intended direction of forward travel of the apparatus and the said longitudinal axis of the drive path is aligned along the said intended direction of forward travel.

When a direction of movement, or a direction relating to a component, is referred to in connection with the horizontal or vertical, it is to be appreciated that these directions are to be considered when the apparatus is standing on horizontal ground and intended for normal operation.

Preferably each cutting device is driven by its associated drive device from behind the cutting device relative to the intended direction of travel of the apparatus.

Conveniently the said drive devices are linked by a transverse drive linkage adapted to be coupled to a source of power or driving the cutting devices, for example to the power-take-off (p-t-o) of a tractor. Conveniently the transverse drive linkage may comprise a drive shaft having a telescopic linkage to accomodate independent vertical movement of the drive devices.

In preferred arrangements, each drive device comprises a gear box, and conveniently each gearbox includes gear means accepting an input drive inclined to the vertical and providing an output drive about a substantially vertical rotary shaft which is coupled to the associated cutting device by the said endless drive member or members of the cutting device.

Although the invention may be put into effect with disc cutters, the invention has particular application where each cutting device comprises a drum cutter having a driven drum body carrying cutting elements and rotatably mounted on a non-driven vertical shaft which has a ground skid for supporting at least partially the cutting device on the ground. It is particularly preferred that the vertical shaft should be non-rotary, and that the ground skid should be non-rotary. Where as has been set out above, each cutting device with its associated drive device is mounted on a subframe, it is particularly preferred that the vertical shaft and the ground skid should be fixedly mounted relative to the subframe. Each endless, elongate drive member may consist, for example, of a V-section drive belt, chain, or a Hy-vo belt, trained about pulley wheels, sprockets, or other rotary drive and driven elements. The drive may be a timed drive by toothed belt or belts, roller chain, or the like, or may be an untimed drive by a round, flat or V-section belt or belts which allow a degree of slipping in the event of the cutting devices encountering an obstacle during operation.

One advantage of the present invention is that the provision of one or more endless elongate drive members (such as drive belts) to couple the cutting devices to the drive devices (such as gear boxes containing bevel gears) is that the drive devices are shielded from shocks imparted to the cutting devices from the ground by virtue of the intermediate endless drive members between the cutting devices and the drive devices.

In some embodiments with preferred features of the present invention where drum cutters are used it is also an advantage that the drum bodies of the cutting devices can be mounted on non-rotary vertical shafts which can be made of robust nature and are more able to withstand ground shocks than previously used rotary central spindles leading directly from overhead gear boxes on drum-type mowers.

The cutting devices may be offset from each other relative to the direction of forward travel of the apparatus, but it is preferred that the axes of rotation of the cutting devices are spaced apart in a direction at right angles to the direction of forward travel of the cutting apparatus.

Preferably the rotary cutting devices of the said at least one pair are arranged to be driven in contrarotation in such a manner that at the front of the cutting devices (relative to the direction of forward travel of the crop cutting apparatus) the circumferential movement of the cutting devices is inward towards one another.

As with conventional mowers, provision must be made in embodiments of the present invention to avoid blades of adjacent cutting devices contacting each other during operation. Conventionally, this is achieved either by providing timed rotation of the cutting devices, in which case the cutting blades can be allowed to follow paths which overlap each other when viewed from above, or by maintaining the cutting devices at a spacing such that the outer perimeters of the paths traced by the cutting blades do not overlap in such a manner that contact can occur. Either of these methods can be adopted with the present invention, or the required control may be achieved in accordance with a further preferred aspect of the present invention.

In accordance with a preferred aspect of the present invention, a pair of adjacent cutting devices are mounted to allow variation of the horizontal separation of the vertical axes of the cutting devices, and there is provided control means for controlling the spacing of the said axes in such a manner that when the cutting devices are cutting at different levels their cutting paths overlap when viewed from above whereas when the cutting devices are cutting at the same level the cutting paths do not overlap when viewed from above.

Preferably the control means includes means for urging the cutting devices towards each when the cutting devices are cutting at different levels so as to produce the required overlap.

It is further preferred that the control means includes a spacing assembly for maintaining a predetermined minimum distance between the said axes when the cutting devices are cutting at different levels. Conveniently the spacing assembly comprise two cooperating spacing members secured one to each of the adjacent cutting devices and arranged to slide and/or roll over one another as the relative levels of the cutting devices change and to force the cutting devices apart when the cutting devices are cutting at the same level. In one preferred arrangement one spacing member comprises a horizontal roller and the other comprises a convex surface over which the roller moves when the cutting devices pass through a position of cutting at the same level.

As has been mentioned, it is preferred that the or each endless elongate drive member engages with the cutting device and/or drive device associated therewith in an engagement allowing slipping between the elongate drive member and the device engaged in the event of blockage or other abnormal operation of the cutting device. Such an arrangement provides particular advantage when combined with the feature of the invention above when control means are provided for controlling the separation of the cutting devices, since in such a combination it is not necessary to provide timed drive to the cutting devices.

In some circumstances the said control means for controlling the spacing of the cutting devices may be used without the provision of endless, elongate cutting devices, and in such an arrangement there may be provided, in accordance with another aspect of the invention, crop cutting apparatus comprising a main frame, a pair of rotary cutting devices each for cutting crop by rotation about a vertical axis, the vertical axes of the cutting devices being spaced apart transversely relative to the intended direction of forward travel of the apparatus, each cutting device being mounted to allow substantially vertical movement of the device relative to the main frame independent of vertical movement of the other cutting device, and control means for controlling the spacing of the said axes in such a manner than when the cutting devices are cutting at different levels their cutting paths overlap when viewed from above whereas when the cutting devices are cutting at the same level the cutting paths do not overlap when viewed from above. In such arrangements, there may of course be provided more than one pair of cutting devices.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENT

Figure 1:
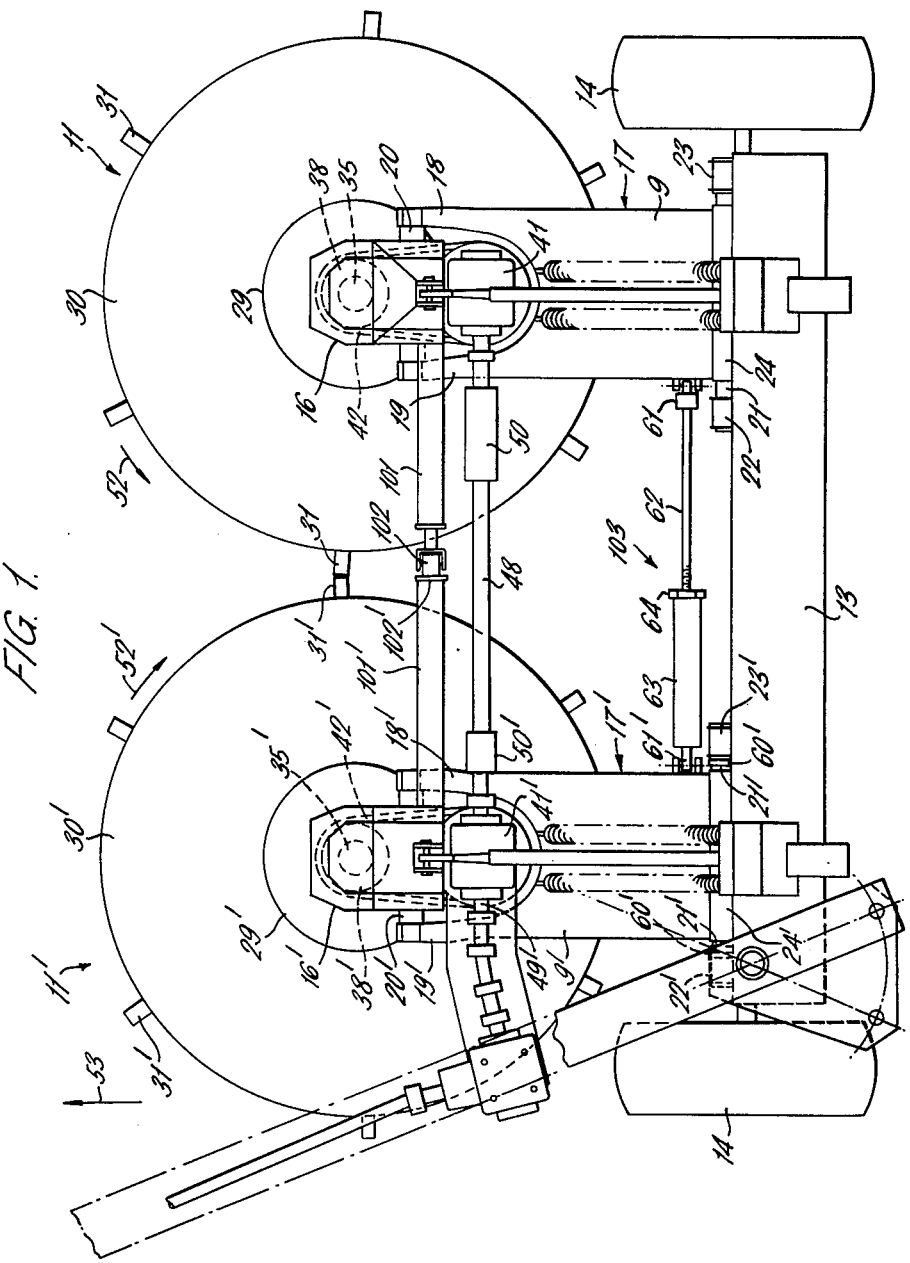
FIG. 1 is a plan view of a rotary mower embodying the present invention.
Figure 2:
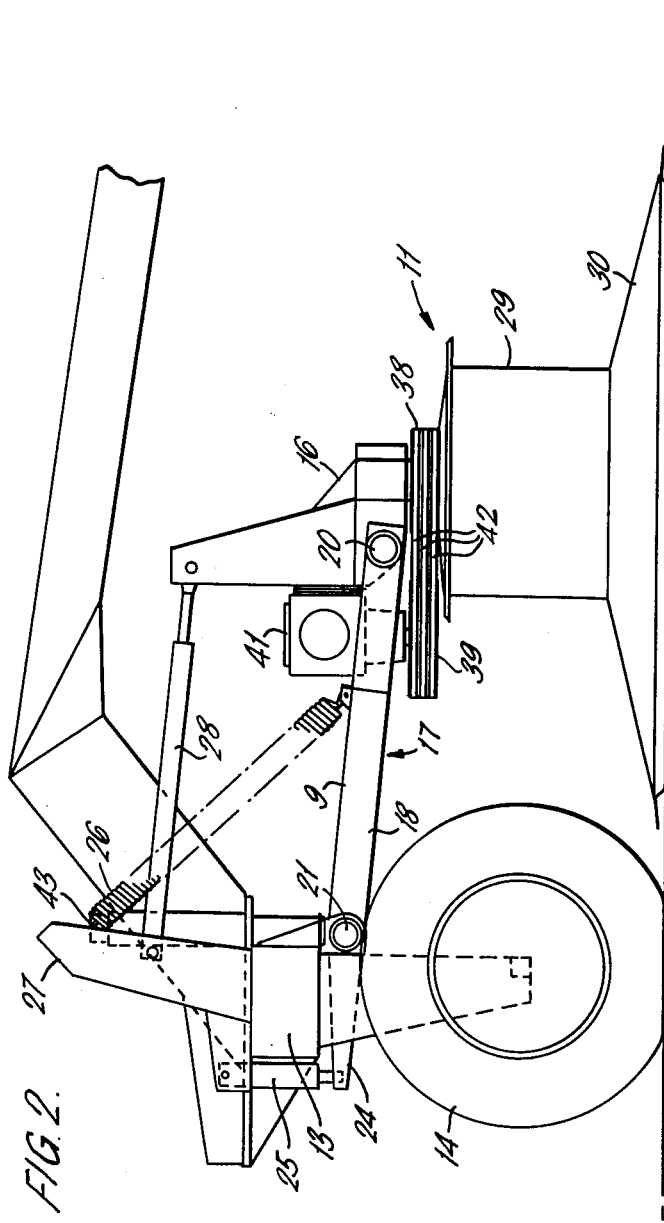
FIG. 2 is a general side view of the mower shown in FIG. 1.

Referring to FIGS. 1 and 2, a rotary mower embodying the present invention comprises a pair of rotary cutting devices 11 and 11' mounted on a main frame 13 carried on land wheels 14. Considering firstly the cutting device 11, this is mounted on a sub-frame 16 which is coupled to the main frame 13 by a pivotal linkage indicated generally at 17. A support member 9 has side struts 18 and 19 pivotally linked at 20 to the sub-frame 16, and the support member 9 is also pivotally linked to the main frame 13 by a cross-member 21 mounted on the frame 13 by way of bearings 22 and 23. The drum 11' is similarly mounted and corresponding members are indicated by primed reference numerals.

Throughout the description where elements are duplicated for the two cutting devices, detailed explanation will only be given with reference to the cutting device 11, since the other cutting device 11' has a corresponding construction which does not need separate description.

The support member 9 is extended rearwardly by an extension 24 to an hydraulic ram 25 coupled between the end of the extension 24 and the main frame 13. Corresponding extensions extend rearwardly from the support member 9' and a corresponding ram arrangement is made. Support members 9 and 9' are also coupled to the main frame 13 by four coil springs of which one spring 26 is shown in FIG. 2 leading from the support member 9 to an upper extension 27 of the main frame 13. Finally there is provided a further rigid link 28 pivotally coupled between the upper part of the subframe 16 and the upper extension 27 of the main frame 13. (For simplicity, the elements 26 and 28, shown in FIG. 2, are omitted from FIG. 1). The link 28 is generally parallel to the support member 9 and is arranged to be of similar length to ensure that the cutting device 11 maintains its required relationship to the ground during vertical movement of the cutting device. The link 28 is also provided with a length adjustment so that the correct relationship of the cutting device 11 to the ground can be achieved. The spring arrangement 26 is provided so that the correct ground pressure can be provided to obtain good ground flotation of the cutting device 11. The spring load of the spring 26 can be adjusted by means of an adjusting screw 43 shown in FIG. 2. The purpose of the ram 25 is to enable the cutting device 11 to be lifted to give adequate clearance when manuevering the mowing apparatus before or after normal operation.

Figure 3:
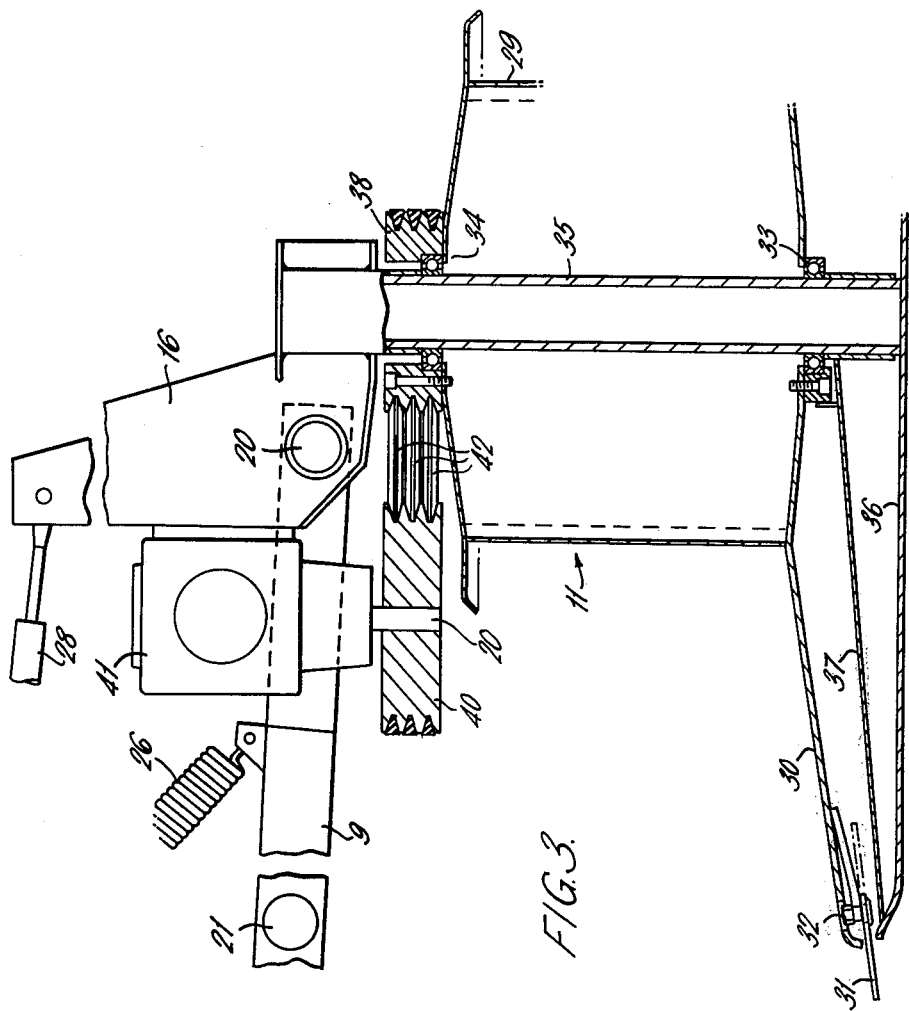
FIG. 3 is a side view partly in section of part of the mower shown in FIG. 2.

As shown in FIG. 3, the cutting device 11 comprises a vertical drum 29 which has at its lower end an outwardly directed annular flange or skirt 30 having a diameter approximately two and a half times the diameter of the drum 29. Pivotted to the underside of the outer perimeter of the skirt 30 are six cutting blades 31 which extend outwardly from the skirt 30 in operation, but can pivot about pivot pins 32 upon striking an object more substantial than the crop to be cut. The drum 29, skirt 30 and blades 31 are all mounted upon bearings 33 and 34 for rotation about a vertical, non-rotary central shaft 35 which extends downwardly from the sub-frame 16.

The central shaft 35 is formed integrally with a ground engaging skid member 36 having almost the same diameter as the drum skirt 30 and having an internal strengthening web 37. The upper end of the central shaft 35 is secured by clamping to the sub-frame 16 so that the cutting device 11 is supported from the sub-frame 16 by means of a substantial, solid assembly which is rigidly connected through to the skid member 36, the shaft 35 and the skid member 36 being integrally formed as a single unit for extra strength and rigidity.

The drive to the cutting device 11 is provided by means of a pulley 38 mounted at the head of, and fixed relative to, the drum 29. A corresponding pulley 40 is mounted on a shaft depending from a gear box 41 which in turn is fixedly secured to the sub-frame 16. The drive between the pulleys 38 and 40 is by endless V-section drive belts 42. As shown in FIG. 1, the cutting device 11' is driven by a similar arrangement from a gear box 41' driving V-belts 42' trained about pulley wheels 38' and 40'. An adjustment of the tension of the belts 42 and 42' is provided by means (not shown) for adjusting the distance between the gear boxes 41 and 41' and the central shafts 35 and 35' respectively.

As shown in FIG. 1, the two gear boxes 41 and 41' are coupled together by a splined shaft 48 having two universal joints 50 and 50'. Drive to the gear boxes 41 and 41' is provided by an input shaft 49' to the gear box 41', the input shaft being coupled to the p-t-o of a tractor (not shown) which is arranged to pull the main frame 13 by coupling to the tractor hitch-point. The splined shaft 48 is a loose sliding fit to allow the required independent vertical movement of the cutting devices 11 and 11' and also to allow a relative horizontal movement permitted between the cutting devices 11 and 11'. This relative horizontal movement is achieved by having the support member 9 slideable transversely of the frame 13 relative to the bearings 22 and 23, and has a purpose which will be described hereinafter with particular reference to FIGS. 4, 5 and 7.

In operation, the gear boxes 41 and 41' are arranged to drive the cutting devices 11 and 11' in contra rotation as indicated by arrows 52 and 52' in FIG. 1. The direction of intended travel of the apparatus is indicated by arrow 53 in FIG. 1.

In the arrangement shown, the V-belts 42 and 42' are not toothed and are not intended to provide a timed relationship between the rotating cutting devices 11 and 11'. Consequently the paths of the cutter blades 31 and 31' need to be arranged in such a manner that there is no overlap of the cutting paths which might allow the blades to strike each other during rotation of the cutting devices. In a simple arrangement (not shown) this may be achieved merely by spacing the axes of the cutting devices 11 and 11' sufficiently far apart to ensure that no overlap occurs. However it is much preferred that there should be provided control means, such as indicated generally at 100 to vary the horizontal spacing of the cutting devices during their independent vertical movement.

Figure 4:
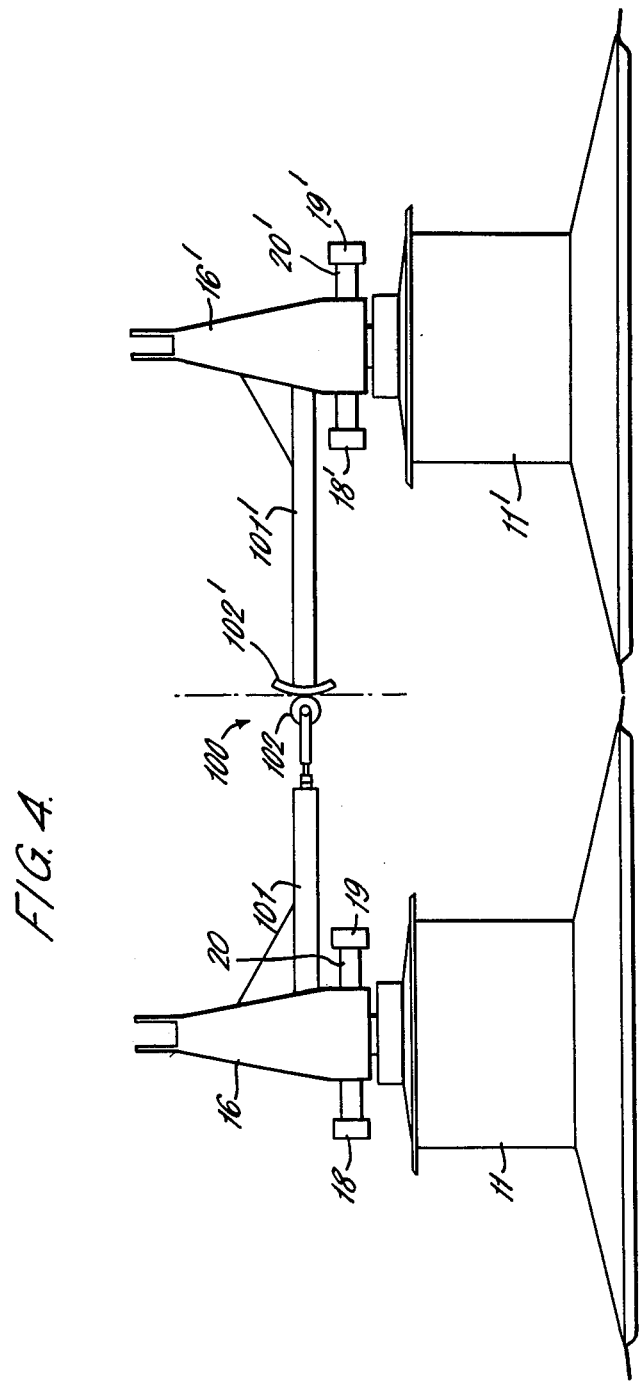
FIG. 4 is a front view of the same mower showing a spacing control means embodying a feature of the invention in place on the mower.

The control device 100 will now be described with particular reference to FIGS. 4 to 7. As shown in FIG. 4, the sub-frame 16 carries a transversely extending beam 101 terminating in a roller 102, and the sub-frame 16' carries a corresponding beam 101' terminating in a convex steel plate 102' providing a cam surface for the roller 102 to roll over. The support members 9 and 9' are linked together by an adjustable tie bar 103 pivotally coupled to the members 9 and 9' close to the cross-members 21 and 21'.

Figure 5:
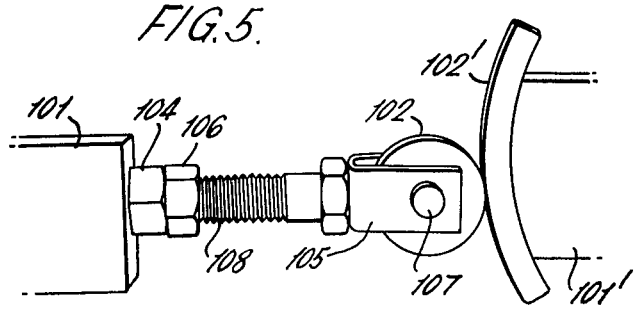
FIG. 5 is a perspective view showing in more detail part of the control means illustrated in FIG. 4.
Figure 6:
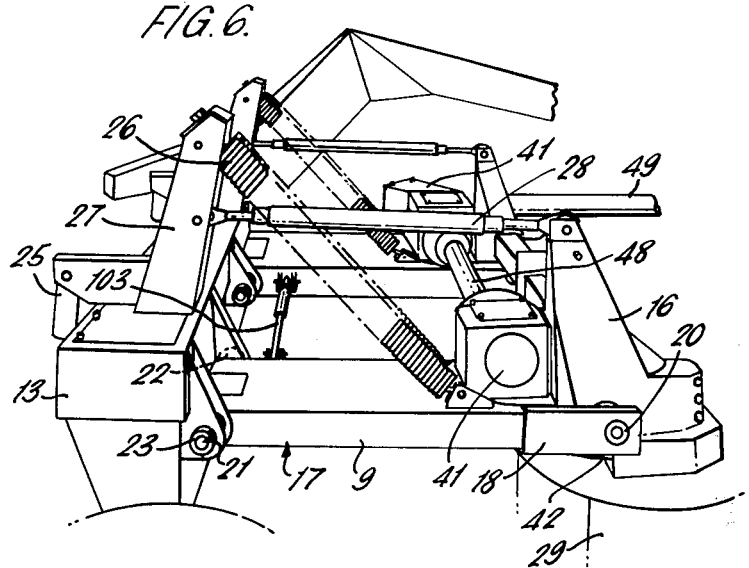
FIG. 6 is a perspective view showing an upper part of the apparatus illustrated in the preceding figures.

FIG. 5 shows the manner of mounting of the roller 102 and the cam plate 102'. The beam 101 terminates in an internally threaded nut portion 104 into which is screwed a threaded support column 108 of a U-shaped bracket member 105. The support column allows adjustment of the spacing of the roller 102 from the sub-frame 16, and is locked into position by a lock nut 106. The roller 102 is rotatably mounted on a ball bearing journal (not shown) on an axial pin 107 mounted on the bracket 105.

By way of example, where the axes of the cutting devices 11 and 11' are some 5 feet apart, the roller 102 may be a 6 inch long cylinder of 2 inch diameter and the beams 101 and 101' may be 18 inches long, with a 3 inch square section. The beams, the roller and the cam surface may all conveniently be made of steel. The maximum amount of transverse movement of the sub-frame 16 is limited by the bearings 22 and 23 and may for example be such as to give a total movement of 1½ inches.

It is to be appreciated that it would be possible to allow both the support members 9 and 9' freedom to move transversely by their respective shafts 21 and 21' moving in bearings 22, 23, 22' and 23', but in the embodiment shown it has been found sufficient to allow the support member 9 only to move transversely. One or more spacers 60' are provided on the shaft 21' to prevent unwanted transverse movement of the support body 9'.

The tie bar 103 is pivotally coupled by pivot links 61 and 61' to the support members 9 and 9' to allow the required independent vertical movement of the cutting devices 11 and 11'. The effect of the tie bar 103 is that when the support members 9 and 9' pivot up or down in opposite directions (due to the cutting devices 11 and 11' operating at different levels), the support member 9 is pulled towards the support member 9' by tension in the tie bar 103. When however the cutting elements 11 and 11' approach the same level of operation, the tie bar 103 approaches the horizontal and allows the sub frames 16 and 16' to be forced apart by the contact of the roller 102 and cam 102'.

The tie bar 103 is adjustable in length by means of a threaded adjustment coupling 62 which can be locked to a chosen adjustment. A convenient method of adjustment of the machine has been found to be firstly to set up the machine on level ground with the ground skids 36 resting on the ground. The support member 9 is then moved relative to the member 9' until the outer circumferences of the paths of the cutters 31 and 31' just clear each other. The roller adjustment 104, 108 is then adjusted to bring the roller 102 and cam 102' into contact with each other and is locked. Finally, the length adjustment of the tie bar 103 is shortened by a small amount (for example by one turn of the thread adjustment) and is locked to the chosen length. This last shortening adjustment is made to take up slack in the various pivotal linkages, but it will be appreciated that the cutters 31 and 31' are still prevented from overlapping because the required spacing by the roller and cam 102, 102' has already been fixed.

(In other arrangements, not shown, the tie bar 103 may be replaced by a tension spring for urging the cutting devices 11 and 11' together. Such a spring may be coupled, for example, between the support members 9 and 9' in place of the tie bar 103, or between the sub frames 16 and 16' close to the elements 101 and 101'. Various other linkages between the cutting devices may be used as alternatives, for example, a chain in place of the tie bar 103).

Figure 7:
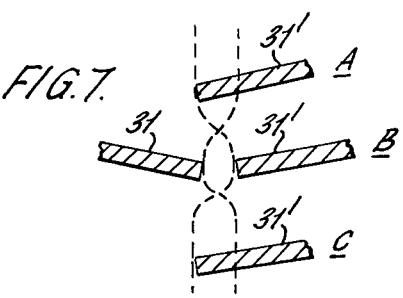
FIG. 7 illustrates in diagrammatic side view the relative dispositions of the cutter blades of the two cutting devices during relative vertical movement between them.

FIG. 7 shows in diagrammatic form the varying relative positions between the cutter blades 31 and 31' during independent vertical movement between the cutting devices 11 and 11'. Where for example a cutter blade 31' is cutting above the level of a cutter blade 31, as shown at A in FIG. 7, the cutting path traced out by the blade 31' will overlap at its outer perimeter the cutting path traced out by the cutting blade 31. Similarly when the cutting blade 31' is cutting at a level lower than the cutting blade 31, as shown at C in FIG. 7, the cutting path traced out by the cutting blade 31 will overlap the cutting path of the cutting blade 31'. As shown by the dotted lines in FIG. 7 (which show the paths of vertical movement of the cutting blades during independent vertical movement of the cutting devices 11 and 11') when the cutter blades 31 and 31' are cutting at the same level, as shown at B in FIG. 7, the cutter blades 31 and 31' are forced apart so as to leave a small gap between the outer perimeters of the cutting paths and to avoid any possibility of the cutter blades striking each other during rotation. The cutting devices 11 and 11' are forced apart to produce this clearance by the roller 102 rolling over the cam plate 102' during the vertical movement. This co-operation of the roller 102 and the cam plate 102' causes the support member 9 (FIG. 1) to slide away from the support member 9' by movement of the shaft 21 in bearings 22 and 23. Once the roller 102 has rolled clear of the cam plate 102' (FIG. 5) the tie bar 103 produces sliding movement of the support member 9 back towards the support member 9', and the cutting devices 11 and 11' return to positions in which the cutting paths of the cutters 31 and 31' again overlap.

During normal cutting operation when the cutting devices are cutting at slightly different levels, the support members 9 and 9' are prevented from moving towards each other beyond a pre-determined minimum distance by the bearing 22 acting as a stop. Similarly when the cutting devices are forced apart when cutting at the same level, the support members 9 and 9' are prevented from moving apart beyond a predetermined maximum distance by virtue of the bearing 23 also acting as a stop.

By way of example of dimensions which may be used with the embodiment described, the overall cutting width may be 3 m, the diameter of each cutting path of the cutters 31 or 31' may be 1510mm and each drum 29 and 29' may have a diameter of 500 mm. The ground load on each skid 36 may be in the range 10 to 100 kg according to conditions, where by way of example the overall weight of the apparatus is 1470 kg.

Considering firstly the embodiment of the invention described in its broadest aspect, a number of advantages arise.

One advantage is that the vertical axis of each cutting device is spaced horizontally from the vertical drive axis of its associated gear box so that any ground shocks transmitted upwardly to the main shaft of the cutter unit are not fed directly into the gear box, as is the case in conventional gear box driven cutter units.

A further advantage arises by the nature of the resilient, shock absorbing drive between the gear boxes and the cutter units which is given by use of resilient drive belts. When these drive belts are untoothed as shown, a further advantage arises in that any temporary blockage of rotation of the cutting blades does not result in damage to a timed drive, but instead the shock is absorbed by slight slippage of the drive belts.

Referring to FIG. 2, it will be appreciated that, compared with known drum mowers in which the gear box is mounted directly above the drum, the centre of gravity of the drum and gear box assembly is moved rearwardly by the spacing of the gear box rearwardly of the drum. The pivot at mounting 20 is positioned substantially at the centre of gravity of the drum and gear box assembly, that is, to the rear of the axis of rotation of the drum.

The construction described is particularly applicable to the production of a much larger scale drum mower than has previously been possible. For example, the overall diameter of the drum skirts can be made typically in the range 3 to 8 feet with the diameter of the supporting drums typically in the range 1 to 4 feet. Such a size of drum mower gives an overall cutting width in the range 6 to 16 feet.

The construction described gives a simple arrangement for independent drum suspension and allows a particularly robust one piece assembly of the central, non-rotary shaft of the cutter and the lower ground engaging skid member.

The independent vertical movement available for the cutter units means that these are not so prone to damage if the drums become jammed by an object being caught between the cutter units. In such a case the independent vertical movement of the drums allow the jamming objects to come free more easily.

The separate positioning of the gear boxes spaced from the cutter units allows greater ease of maintenance than in a conventional construction of drum mower.

Another advantage which arises from the manner of mounting of the gear boxes and cutting devices on the sub-frames is that the pulleys about which the drive belts are entrained rise and fall together with the vertical movement of the sub-frame so avoiding any possibility of misalignment of the drive belts.

Considering next the particular feature of the control means 100, it is an advantage that the full width of the crop traversed by the apparatus is cut, without leaving a line of stubble between the drums. This is achieved without the need for timed drive (with added complication and expense) and the untoothed drive belts used allow a degree of slipping of the drive in the event of jamming of the cutters. Also the adjustable mounting of the roller 107 on the threaded column 108 allows an easy adjustment of the spacing between the cutting devices to take account of any wear at the blade tips after prolonged operation.

It is to be appreciated that in accordance with the spacing control aspect of the invention, a number of alternative constructions may be provided. For example the cam plate 102' of FIG. 5 may be replaced by a second roller similar to the roller 102. In another modification, the roller 102 and cam plate 102' may be replaced by a pivotted thrust-bearing strut positioned transversely across the line of forward travel of the apparatus and coupled between the sub-frames 16 and 16'. The strut may be pivotally mounted so as to be horizontal when the cutting devices are cutting at the same level (and in this position to force the cutting devices apart to a distance such as to prevent overlap of the cutters) but to be inclined to the horizontal when the cutting devices are cutting at different levels (and in this position to allow the cutting devices to approach one another and the cutter blades to overlap.)

In a modification, a transverse parallelogram linkage may be provided between the subframes. Side members of the parallelogram linkage may be fixed vertical members, and transverse members may be pivotally linked for pivoting about axes parallel to the direction of forward travel of the apparatus. Conveniently the linkage may take the form of a rectangle when the cutters are cutting at the same level, maintaining the sub-frames 16 and 16' at a fixed maximum distance apart sufficient to prevent overlap of the cutter blades 31 and 31', but to convert to a non-rectangular parallelogram when the cutting devices are cutting at different levels, the parallelogram configuration allowing the sub-frames 16 and 16' to approach each other more closely for conditions when the cutting devices are cutting at different levels.

In some arrangements, the above described thrust strut or parallelogram linkage may be provided in addition to the roller and cam arrangement. Obviously, many modifications and variations of the present invention are possible in light of the aforenoted teachings. It is therefore to be understood that the present invention may be practiced, within the scope of the appended claims, otherwise than as specifically described herein.

We claim:

1. Crop cutting apparatus, comprising:
a main frame;
at least one pair of rotary cutting devices each for cutting crop by rotary movement of cutting elements of the cutting device about a vertical axis which passes through a ground skid for supporting at least partially the cutting device upon the ground, the vertical axes of the cutting devices being spaced apart transversely relative to the intended direction of forward travel of the apparatus;
each cutting device having a drive device individual thereto spaced from the axis of the cutting device and at least one endless elongate drive member coupling the drive device to the cutting device for driving the cutting device in rotation;
each cutting device having a subframe individual thereto movably mounted upon said main frame so as to allow substantially vertical movement of each cutting device with its subframe relative to said main frame independent of vertical movement of said other cutting device or devices, the vertical movement allowed being sufficient to enable each cutting device to follow undulating ground; and
each cutting device being suspended directly from its associated subframe, and each drive device being directly attached to its associated subframe such that each cutting device is mounted together with its associated drive device upon said associated subframe for movement of both said cutting device and said drive device with said subframe during said vertical movement.

2. Crop cutting apparatus, comprising:
a main frame;
at least one pair of rotary cutting devices each for cutting crop by rotary movement of cutting elements about a vertical axis which passes through a ground skid for supporting at least partially the cutting device on the ground;
a mechanical input drive linkage for supplying drive to the rotary cutting devices;
each cutting device having a subframe individual thereto movably mounted on the main frame to allow substantially vertical movement of the subframe relative to the main frame independent of vertical movement of the other subframe or subframes;
each cutting device having a mechanical drive device individual thereto coupled to said mechanical input drive linkage and providing an output rotary drive about a vertical axis spaced from the axis of the cutting device, the drive device and the cutting device being coupled together by at least one endless elongate drive member for driving the cutting device in rotation; and
each cutting device being suspended directly from its associated subframe, and each drive device being directly attached to its associated subframe such that each cutting device and its associated drive device are both mounted together upon the associated subframe for vertical movement with the subframe independent of vertical movement of the other subframe or subframes.

3. Crop cutting apparatus, comprising:
a main frame;
at least one pair of rotary cutting devices each for cutting crop by rotary movement of cutting elements about a vertical axis which passes through a ground skid for supporting at least partially the cutting device on the ground;
a mechanical drive linkage positioned transversely of the apparatus relative to the direction of forward travel for supplying drive to the rotary cutting devices;
each cutting device having a subframe individual thereto mounted upon the main frame for vertical movement relative to the main frame independent of vertical movement of the other subframe or subframes;
each cutting device including a drum carrying the cutting elements and mounted for rotary movement about a non-driven vertical shaft which is fixed to and extends between said ground skid and the subframe;
each cutting device having a mechanical drive device individual thereto coupled to the transverse drive linkage, the drive device comprising gear means accepting an input drive inclined to the vertical and providing an output drive about a substantially vertical shaft which is spaced from the axis of the cutting device and is coupled to the cutting device by at least one elongate drive belt for driving the cutting device in rotation;
each subframe being linked to the main frame by a pivotal linkage of parallel members which allows vertical movement of the subframe while maintaining the disposition of the subframe to the ground substantially constant; and
each cutting device being suspended directly from its associated subframe, and each drive device being directly attached to its associated subframe such that each cutting device and its associated drive device are both mounted together on the associated subframe for vertical movement with the subframe independent of vertical movement of the other subframe or subframes.

4. Crop cutting apparatus, comprising:
a main frame;
a pair of rotary cutting devices each for cutting crop by rotary movement of cutting elements of said cutting device about a vertical axis, the vertical axes of said cutting devices being spaced apart transversely relative to the intended direction of forward travel of said apparatus;
each cutting device being mounted so as to allow substantially vertical movement of said device relative to said main frame independent of any vertical movement of said other cutting device, and each cutting device being so mounted as to allow variation of the horizontal separation of the vertical axes of said cutting devices; and
control means for controlling the spacing of said axes in such a manner that when said cutting devices are cutting at different levels their cutting paths overlap when viewed from above, whereas when said cutting devices are cutting at the same level, the cutting paths do not overlap when viewed from above.

5. Apparatus as set forth in claim 4, wherein:
said control means includes a spacing assembly for maintaining a predetermined minimum distance between said axes when said cutting devices are cutting at different levels, said spacing assembly comprising two cooperating spacing members coupled one to each of said adjacent cutting devices and arranged to move over one another as the relative levels of said cutting devices change so as to force said cutting devices apart when said cutting devices are cutting at the same level.

6. Crop cutting apparatus, comprising:
a main frame;
at least one pair of rotary cutting devices each for cutting crop by rotary movement of cutting means of the cutting device about a vertical axis, the vertical axes of said cutting devices being spaced apart transversely relative to the intended direction of forward travel of said apparatus;
each cutting device having a drive device individual thereto spaced from the axis of said cutting device and at least one endless elongate drive member coupling said drive device to said cutting device for driving said cutting device in rotation;
each cutting device having ground engaging support means for supporting at least partially said cutting device upon the ground by contact of said support means with said ground inside the boundary of the area swept by said cutting means of said cutting device during rotation;
each cutting device having a subframe individual thereto movably mounted upon said main frame so as to allow substantially vertical movement of said cutting device with its subframe relative to said main frame independent of vertical movement of said at least one other cutting device, the vertical movement allowed being sufficient to enable each cutting device to follow undulating ground; and
each cutting device being suspended directly from its associated subframe, and each drive device being directly attached to its associated subframe such that each cutting device is mounted together with its associated drive device upon said associated subframe for movement of both said cutting device and said drive device with said subframe during said substantially vertical movement.

7. Apparatus according to claim 6 in which each subframe is linked to the main frame by a pivotal linkage of parallel members which allows vertical movement of the subframe while maintaining the disposition of the subframe to the ground substantially constant, the said pivotal linkage being aligned along the intended direction of travel of the apparatus with the pivotal axes substantially horizontal and perpendicular to the said intended direction of travel.

8. Apparatus according to claim 6 in which each drive device comprises a gear box including gear means accepting an input drive inclined to the vertical and providing an output drive about a substantially vertical rotary shaft which is coupled to the associated cutting device by the said at least one endless elongate drive member of the cutting device.

9. Apparatus according to claim 6 in which each cutting device comprises a drum cutter having a driven drum body carrying cutting elements and rotatably mounted on a non-driven vertical shaft which has a ground skid for supporting at least partially the cutting device on the ground, the vertical shaft and the ground skid being fixedly mounted relative to the subframe.

10. Apparatus according to claim 6 in which a pair of adjacent cutting devices are mounted to allow variation of the horizontal separation of the vertical axes of the cutting devices, and there is provided control means for controlling the spacing of the said axes in such a manner that when the cutting devices are cutting at different levels their cutting paths overlap when viewed from above whereas when the cutting devices are cutting at the same level the cutting paths do not overlap when viewed from above.

11. Apparatus according to claim 10 in which the control means includes means for urging the cutting devices towards each other when the cutting devices are cutting at different levels so as to produce the required overlap.

12. Apparatus according to claim 10 in which the control means includes a spacing assembly for for maintaining a predetermined minimum distance between the said axes when the cutting devices are cutting at different levels, the spacing assembly comprising two cooperating spacing members coupled one to each of the adjacent cutting devices and arranged to move over one another as the relative levels of the cutting devices change and to force the cutting devices apart when the cutting devices are cutting at the same level.

13. Apparatus according to claim 10 in which said at least one elongate endless drive member engages with at least one of said devices associated therewith in an engagement allowing slipping between the drive member and the device engaged in the event of blockage or other abnormal operation of the cutting device.

14. Apparatus according to claim 6 in which each subframe is pivotally linked to the main frame, and has a main transverse pivot axis positioned substantially in the same vertical plane as the centre of gravity of the subframe, cutting device and drive device assembly, with the drive device and cutting device positioned one to the fore and one to the aft of the transverse pivot axis.

15. Crop cutting apparatus as set forth in claim 14, wherein:
said transverse pivot axis passes substantially through said center of gravity of said assembly of said subframe, cutting device, and said drive device.

16. Apparatus as set forth in claim 6, further comprising:
a mechanical input drive linkage for supplying drive for operating said apparatus, each of said drive devices comprising a mechanical drive device driven by said mechanical input drive linkage.

17. Apparatus according to claim 16 in which the said drive devices are linked by a transverse drive linkage adapted to be coupled to a source of power for driving the cutting devices.

18. Apparatus as set forth in claim 16, wherein:
each drive device is disposed so as to provide for its associated cutting device a rotary output drive about a vertical axis spaced from the vertical axis of said associated cutting device; and
said at least one endless enlongate drive member is disposed so as to circumvent said two vertical axes.

19. Apparatus as set forth in claim 6, wherein:
each cutting device has a non-driven vertical shaft fixedly mounted relative to said associated subframe of said cutting device, said cutting means of said cutting device being mounted for rotation about said non-driven vertical shaft, and said ground engaging support means of said cutting device being mounted upon said non-driven vertical shaft.

20. Apparatus as set forth in claim 6, wherein:
each cutting device comprises a drum cutter having a driven drum body mounted for rotation about said vertical axis of said cutting device; and
said cutting means of said device device comprises cutting elements carried by said driven drum body.

* * * * *